(12) United States Patent
Fernandez-Orellana et al.

(10) Patent No.: US 11,704,454 B2
(45) Date of Patent: Jul. 18, 2023

(54) FIRE SUPPRESSION SYSTEM—END-TO-END SOLUTION FOR FIRE SUPPRESSION SALES AND DESIGN

(71) Applicant: CARRIER CORPORATION, Palm Beach Gardens, FL (US)

(72) Inventors: Pedro Fernandez-Orellana, Shanghai (CN); Ankit Tiwari, South Windsor, CT (US); Michele Garraffa, Cork (IE); Kushal Mukherjee, New Delhi (IN); Daniele Campana, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 63 days.

(21) Appl. No.: 15/734,457

(22) PCT Filed: Sep. 13, 2019

(86) PCT No.: PCT/US2019/050944
§ 371 (c)(1),
(2) Date: Dec. 2, 2020

(87) PCT Pub. No.: WO2020/056222
PCT Pub. Date: Mar. 19, 2020

(65) Prior Publication Data
US 2021/0224433 A1  Jul. 22, 2021

(30) Foreign Application Priority Data
Sep. 13, 2018  (CN) .......................... 201811068966.3

(51) Int. Cl.
*G06F 30/18*  (2020.01)
*G06F 113/14*  (2020.01)
(Continued)

(52) U.S. Cl.
CPC .............. *G06F 30/18* (2020.01); *A62C 35/68* (2013.01); *G06F 30/12* (2020.01);
(Continued)

(58) Field of Classification Search
CPC ...... G06F 30/18; G06F 2113/14; G06F 30/12; G06F 2111/00; G06F 2119/22; A62C 35/68
See application file for complete search history.

(56) References Cited

U.S. PATENT DOCUMENTS

| 3,698,481 A | 10/1972 | Livingston |
| 3,702,159 A | 11/1972 | Livingston |

(Continued)

FOREIGN PATENT DOCUMENTS

| CN | 104464165 A | 3/2015 |
| CN | 104679932 A | 6/2015 |

(Continued)

OTHER PUBLICATIONS

Fire Protection & Safety; https://klipboard.io/industry-sectors/fire-protection-safety-software-mobile-app/; 6 pages; 2018.

(Continued)

*Primary Examiner* — Kibrom K Gebresilassie
(74) *Attorney, Agent, or Firm* — Cantor Colburn LLP

(57) ABSTRACT

A method of designing a fire suppression system including: determining nozzle placement for nozzles of a fire suppression system within a location; determining piping placement for pipes of the fire suppression system within the location; determining whether the nozzle placement or piping placement violate a constraint; and generating a map displaying the nozzle placement and the piping placement on a computing device.

14 Claims, 8 Drawing Sheets

(51) Int. Cl.
  *A62C 35/68* (2006.01)
  *G06F 119/22* (2020.01)
  *G06F 30/12* (2020.01)
  *G06F 111/00* (2020.01)

(52) U.S. Cl.
  CPC ....... *G06F 2111/00* (2020.01); *G06F 2113/14* (2020.01); *G06F 2119/22* (2020.01)

(56) References Cited

U.S. PATENT DOCUMENTS

| | | | |
|---|---|---|---|
| 4,058,167 A | 11/1977 | Granek et al. | |
| 5,517,428 A | 5/1996 | Williams | |
| 6,041,171 A | 3/2000 | Blaisdell et al. | |
| 6,567,772 B1* | 5/2003 | Hoeft | G06F 30/00 239/211 |
| 6,701,288 B1 | 3/2004 | Normann et al. | |
| 7,020,697 B1 | 3/2006 | Goodman | |
| 7,096,163 B2 | 8/2006 | Reghetti | |
| 7,171,341 B2* | 1/2007 | Hoeft | G06T 19/20 703/7 |
| 7,895,019 B2 | 2/2011 | Neumann et al. | |
| 8,127,860 B2 | 3/2012 | Golinveaux | |
| 8,150,660 B2* | 4/2012 | Reghetti | G06F 30/13 703/1 |
| 8,285,421 B2* | 10/2012 | Vander Griend | A01G 25/16 703/6 |
| 8,612,189 B2 | 12/2013 | Golinveaux et al. | |
| 8,725,457 B2 | 5/2014 | Nikolayev et al. | |
| 8,874,413 B2 | 10/2014 | Mulligan et al. | |
| 8,886,348 B2 | 11/2014 | Bollendorf | |
| 9,355,062 B2 | 5/2016 | Marshall et al. | |
| 9,662,519 B2 | 5/2017 | Livchak et al. | |
| 9,703,665 B1 | 7/2017 | Haley | |
| 11,433,597 B2 | 9/2022 | Ravich et al. | |
| 2002/0026343 A1 | 2/2002 | Duenke | |
| 2003/0101029 A1 | 5/2003 | Drumheller | |
| 2004/0128116 A1 | 7/2004 | Normann et al. | |
| 2005/0284645 A1 | 12/2005 | Golinveaux | |
| 2007/0179758 A1 | 8/2007 | Neumann et al. | |
| 2007/0186094 A1 | 8/2007 | Ghantous et al. | |
| 2007/0288207 A1 | 12/2007 | Backe et al. | |
| 2008/0309678 A1 | 12/2008 | Reghetti et al. | |
| 2009/0128558 A1 | 5/2009 | Morello et al. | |
| 2010/0161495 A1 | 6/2010 | Olson et al. | |
| 2010/0169139 A1 | 7/2010 | Koenig-Richardson | |
| 2011/0087988 A1 | 4/2011 | Ray et al. | |
| 2011/0115816 A1 | 5/2011 | Brackney | |
| 2011/0153279 A1 | 6/2011 | Zhang et al. | |
| 2011/0153524 A1 | 6/2011 | Schnackel | |
| 2012/0090700 A1 | 4/2012 | Multer et al. | |
| 2012/0221298 A1 | 8/2012 | Sato et al. | |
| 2013/0006588 A1 | 1/2013 | Mulligan et al. | |
| 2014/0095122 A1 | 4/2014 | Appleman et al. | |
| 2014/0114621 A1 | 4/2014 | Brigandi et al. | |
| 2014/0244219 A1 | 8/2014 | Pappoppula et al. | |
| 2014/0301633 A1 | 10/2014 | Furukawa et al. | |
| 2016/0206904 A1 | 7/2016 | Senegal et al. | |
| 2016/0335731 A1 | 11/2016 | Hall | |
| 2017/0232284 A1 | 8/2017 | Farley et al. | |
| 2017/0308635 A1 | 10/2017 | Kusumoto et al. | |
| 2018/0078801 A1 | 3/2018 | Perkovich | |
| 2018/0256929 A1* | 9/2018 | Williams | A62C 37/38 |
| 2018/0318620 A1* | 11/2018 | Cutting | A62C 31/28 |
| 2020/0378561 A1 | 12/2020 | Kusumoto | |
| 2021/0240875 A1 | 8/2021 | Fernandez-Orellana et al. | |
| 2021/0248280 A1 | 8/2021 | Fernandez-Orellana et al. | |
| 2021/0256173 A1 | 8/2021 | Fernandez-Orellana et al. | |
| 2022/0000042 A1 | 1/2022 | Spiro | |

FOREIGN PATENT DOCUMENTS

| | | |
|---|---|---|
| CN | 106730552 A | 5/2017 |
| CN | 106844929 A | 6/2017 |
| CN | 107526870 A | 12/2017 |
| CN | 107577888 A | 1/2018 |
| CN | 107944106 A | 4/2018 |
| EP | 1273322 A1 | 1/2003 |
| JP | 2010119516 A | 6/2010 |
| KR | 20110051655 A | 5/2011 |
| WO | 2005033912 A2 | 4/2005 |
| WO | 2017191443 A1 | 11/2017 |

OTHER PUBLICATIONS

Free Online Tool Aids Decisions on Fire Sprinkler Systems for Homes; https://www.nist.gov/news-events/news/2011/04/free-online-tool-aids-decisions-fire-sprinkler-systems-homes; Apr. 12, 2012; 6 pages.

International Search Report for International Application No. PCT/US2019/050944, International Filing Date Sep. 13, 2019, dated Dec. 3, 2019, 6 pages.

Written Opinion for International Application No. PCT/US2019/050944, International Filing Date Sep. 13, 2019, dated Dec. 3, 2019, 9 pages.

Block C—Piping Installation; Red Seal; pp. 1-12 (http:www.red-seal.ca/trades/sprinklersysinstal/2014n.4.1_bl.4ckc-eng.html), retrieved Aug. 6, 2018.

Bryan, John L., "Residential Sprinkler Systems", Automatic Sprinkler Systems for Residential Occupancies Handbook, Jan. 1, 2007, pp. 223-269.

Building Control and Fire Management; Tascomi's; pp. 1-7 (http://www.tascomi.com/solution/building-control-fire-management/), retreived Aug. 6, 2018.

Fire Sprinkler System Design; Elite Software—Fire; pp. 1-4 (http://www.elitesoft.com/web/fire/elite_fire_info.html), retrieved Aug. 6, 2018.

International Search Report for International Application No. PCT/US2019/050945, International Filing Date Sep. 13, 2019, dated Dec. 3, 2019, 6 pages.

Placement of Smoke Alarms; Kidde; pp. 1-6 (https://www.kidde.com/home-safety/en/us/fire-safety/placement-of-smoke-alarms/), retreived Aug. 6, 2018.

Vishnoi, "Piping layout for fire sprinkler system: An overview", International Journal of Engineering and Applied Sciences (IJEAS) ISSN: 2394-3661, vol. 4, Issue 3, Mar. 2017, 5 pages.

Written Opinion for International Application No. PCT/US2019/050945, International Filing Date Sep. 13, 2019, dated Dec. 3, 2019, 10 pages.

\* cited by examiner

FIRE SUPPRESSION SYSTEM—END-TO-END SOLUTION FOR FIRE SUPPRESSION SALES AND DESIGN

CROSS REFERENCE TO RELATED APPLICATIONS

This application is a National Stage application of PCT/US2019/050944, filed Sep. 13, 2019, which claims the benefit of China Application No. 201811068966.3, filed Sep. 13, 2018, both of which are incorporated by reference in their entirety herein.

BACKGROUND

The subject matter disclosed herein generally relates to the field of fire suppression systems, and more specifically, an apparatus and method for designing fire suppressions systems.

Conventional building fire suppression systems consist of distributed components that must be designed, identified, installed, and commissioned in accordance with requirements and regulations. The design process has four key stages: (1) Quoting/bidding, (2) design, (3) on-site re-design, and (4) Hand-off to installation team. At present many steps in the process are manual, which leads to a waste of time and resources. The design process is also a major determinant of the total system cost.

BRIEF SUMMARY

According to one embodiment, a method of designing a fire suppression system. The method including: determining nozzle placement for nozzles of a fire suppression system within a location; determining piping placement for pipes of the fire suppression system within the location; determining whether the nozzle placement or piping placement violate a constraint; and generating a map displaying the nozzle placement and the piping placement on a computing device.

In addition to one or more of the features described above, or as an alternative, further embodiments may include: activating an alert when at least one of the nozzle placement and the piping placement violate a constraint.

In addition to one or more of the features described above, or as an alternative, further embodiments may include: receiving an input from a user adjusting at least one of the nozzle placement and the piping placement.

In addition to one or more of the features described above, or as an alternative, further embodiments may include that after receiving an input from a user, the method further includes: determining whether the nozzle placement or piping placement violate a constraint; and activating an alert when at least one of the nozzle placement and the piping placement violate a constraint.

In addition to one or more of the features described above, or as an alternative, further embodiments may include that determining nozzle placement for nozzles of a fire suppression system within a location further includes: determining a geometry of a location in response to a floor plan; determining a type of fire suppression agent required in response to at least one of articles in the location and hazards in the location; determining an amount of fire suppression agent required in response to at least one of the articles in the location, hazards in the location, the geometry of the location, average temperature of the location, and average pressure of the location; and determining a number of nozzles, a type of each of the nozzles, a location of each of the nozzles within the location in response to the amount of fire suppression agent required.

In addition to one or more of the features described above, or as an alternative, further embodiments may include that determining piping placement for pipes of the fire suppression system within the location further includes: obtaining a layout of nozzles within a location for a fire suppression system; determining a number of pipes, a length of each of the pipes, and a location of each of the pipes to connect each nozzle within the location to a fire suppression agent source in response to the layout of nozzles within the location; determining locations of junctions and elbows to interconnect the pipes; and determining whether the pipe, junctions, and elbows violate a piping constraint.

In addition to one or more of the features described above, or as an alternative, further embodiments may include that the constraints include at least one of a building system requirement, a desired level of certification requirement, a nozzle constraint, and a piping constraint.

According to another embodiment, a system for designing a fire suppression system is provided. The system including: a processor; and a memory including computer-executable instructions that, when executed by the processor, cause the processor to perform operations, the operations including: determining nozzle placement for nozzles of a fire suppression system within a location; determining piping placement for pipes of the fire suppression system within the location; determining whether the nozzle placement or piping placement violate a constraint; and generating a map displaying the nozzle placement and the piping placement on a computing device.

In addition to one or more of the features described above, or as an alternative, further embodiments may include that the operations further includes: activating an alert when at least one of the nozzle placement and the piping placement violate a constraint.

In addition to one or more of the features described above, or as an alternative, further embodiments may include that the operations further include: receiving an input from a user adjusting at least one of the nozzle placement and the piping placement.

In addition to one or more of the features described above, or as an alternative, further embodiments may include that after receiving an input from a user, the method further includes: determining whether the nozzle placement or piping placement violate a constraint; and activating an alert when at least one of the nozzle placement and the piping placement violate a constraint.

In addition to one or more of the features described above, or as an alternative, further embodiments may include that determining nozzle placement for nozzles of a fire suppression system within a location further includes: determining a geometry of a location in response to a floor plan; determining a type of fire suppression agent required in response to at least one of articles in the location and hazards in the location; determining an amount of fire suppression agent required in response to at least one of the articles in the location, hazards in the location, the geometry of the location, average temperature of the location, and average pressure of the location; and determining a number of nozzles, a type of each of the nozzles, a location of each of the nozzles within the location in response to the amount of fire suppression agent required.

In addition to one or more of the features described above, or as an alternative, further embodiments may include that determining piping placement for pipes of the fire suppression system within the location further includes: obtaining a layout of nozzles within a location for a fire suppression system; determining a number of pipes, a length of each of the pipes, and a location of each of the pipes to connect each nozzle within the location to a fire suppression agent source in response to the layout of nozzles within the location; determining locations of junctions and elbows to interconnect the pipes; and determining whether the pipe, junctions, and elbows violate a piping constraint.

In addition to one or more of the features described above, or as an alternative, further embodiments may include that the constraints include at least one of a building system requirement, a desired level of certification requirement, a nozzle constraint, and a piping constraint.

According to another embodiment, a computer program product tangibly embodied on a computer readable medium is provided. The computer program product including instructions that, when executed by a processor, cause the processor to perform operations including: determining nozzle placement for nozzles of a fire suppression system within a location; determining piping placement for pipes of the fire suppression system within the location; determining whether the nozzle placement or piping placement violate a constraint; and generating a map displaying the nozzle placement and the piping placement on a computing device.

In addition to one or more of the features described above, or as an alternative, further embodiments may include that the operations further include: activating an alert when at least one of the nozzle placement and the piping placement violate a constraint.

In addition to one or more of the features described above, or as an alternative, further embodiments may include that the operations further include: receiving an input from a user adjusting at least one of the nozzle placement and the piping placement.

In addition to one or more of the features described above, or as an alternative, further embodiments may include that after receiving an input from a user, the method further includes: determining whether the nozzle placement or piping placement violate a constraint; and activating an alert when at least one of the nozzle placement and the piping placement violate a constraint.

In addition to one or more of the features described above, or as an alternative, further embodiments may include that determining nozzle placement for nozzles of a fire suppression system within a location further includes: determining a geometry of a location in response to a floor plan; determining a type of fire suppression agent required in response to at least one of articles in the location and hazards in the location; determining an amount of fire suppression agent required in response to at least one of the articles in the location, hazards in the location, the geometry of the location, average temperature of the location, and average pressure of the location; and determining a number of nozzles, a type of each of the nozzles, a location of each of the nozzles within the location in response to the amount of fire suppression agent required.

In addition to one or more of the features described above, or as an alternative, further embodiments may include that determining piping placement for pipes of the fire suppression system within the location further includes: obtaining a layout of nozzles within a location for a fire suppression system; determining a number of pipes, a length of each of the pipes, and a location of each of the pipes to connect each nozzle within the location to a fire suppression agent source in response to the layout of nozzles within the location; determining locations of junctions and elbows to interconnect the pipes; and determining whether the pipe, junctions, and elbows violate a piping constraint.

Technical effects of embodiments of the present disclosure include automatically designing a fire suppression system in response to building maps and known constraints.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
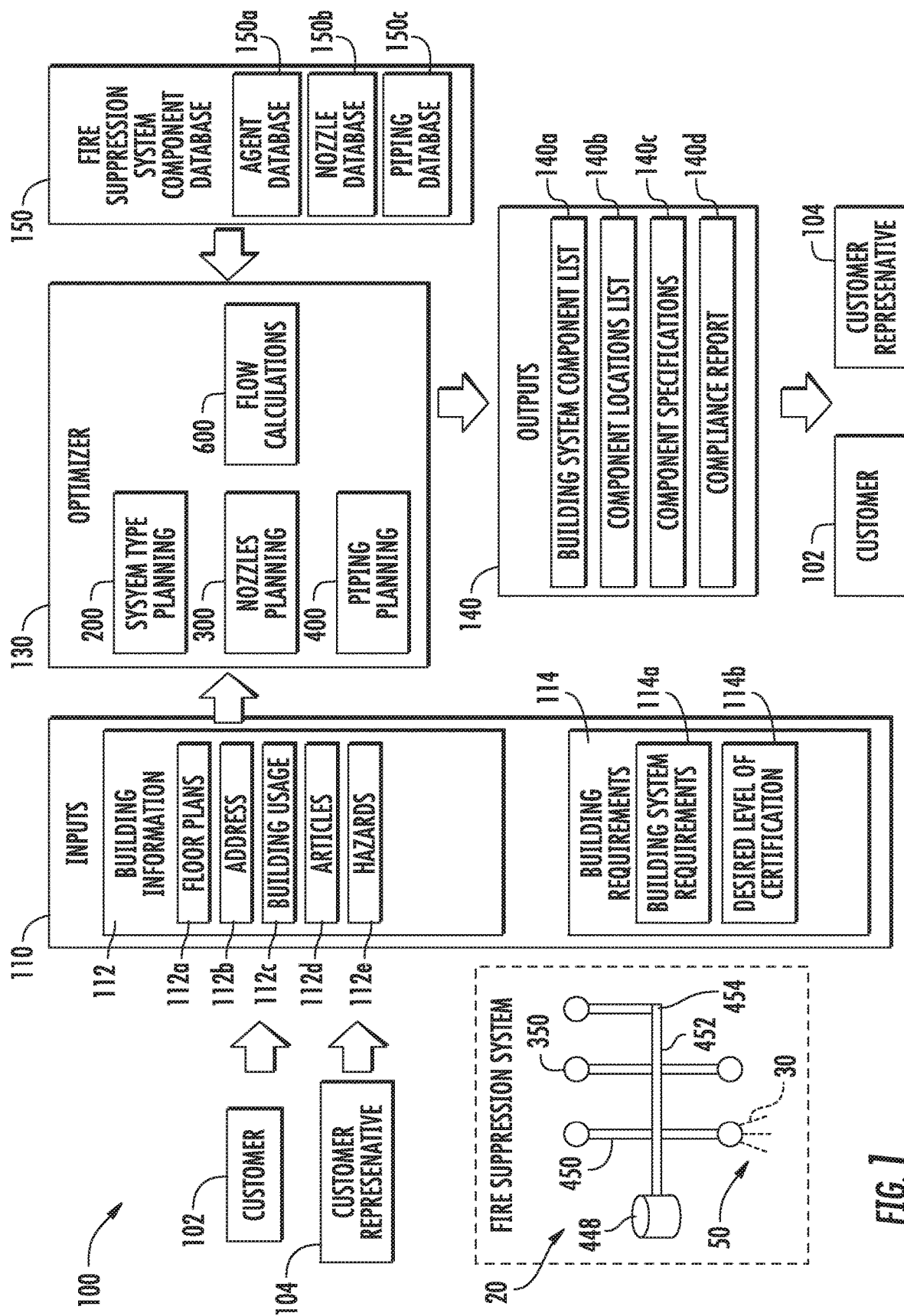
FIG. 1 is a schematic illustration of a system for designing a fire suppression system, in accordance with an embodiment of the disclosure.

Referring now to FIG. 1, which shows a schematic illustration of a system 100 for designing a fire suppression system 20. It should be appreciated that, although particular systems are separately defined in the schematic block diagrams, each or any of the systems may be otherwise combined or separated via hardware and/or software. In an embodiment, the system 100 for designing a fire suppression system may be a web-based system.

FIG. 1 also shows a schematic illustration of a fire suppression system 20, according to an embodiment of the present disclosure. The fire suppression system 20 is an example and the embodiments disclosed herein may be applied to other fire suppression systems not illustrated herein. The fire suppression system 20 comprises a fire suppression agent source 448, one or more nozzles 350, and one or more pipes 450 fluidly connecting the fire suppression agent source 448 to each of the nozzles 350. The one or more pipe 450 may be fluidly connected to each other by junctions 452 and/or elbows 454. A junction 452 may connect a single pipe 450 to two or more other pipes 450 and an elbow 454 may connect one pipe 450 to another pipe 450. A fire suppression agent 30 flows from the fire suppression agent source 448 to each nozzle 350. The nozzles 350 are each configured to distribute the fire suppression agent 30 to an activation zone 50, which may be a room within a building or area of a room.

As discussed below, the system 100 is configured to determine nozzle placement for nozzles 350 of a fire suppression system 20 within a location; determine piping placement for pipes 450 of the fire suppression system 20 within the room; determine whether the nozzle placement or piping placement violate a constraint; and generate a map displaying the nozzle placement and the piping placement on a computing device.

The system 100 comprises a plurality of inputs 110 that are entered into an optimizer 130 configured to determine outputs 140 in response to the inputs 110. The inputs 110 may be entered manually, such as, for example, a customer 102 and/or customer representative 104 entering in the inputs 110 through a computing device. The inputs 110 may also be entered automatically, such as, for example a customer 102 and/or customer representative 104 scanning in the inputs 110.

The inputs 110 may include but are not limited to building information 112 and building requirements 114, as shown in FIG. 1. Building information 112 may include but is not limited to floor plans 112*a* of the building where the fire suppression system 20 is to be located, an address 112*b* of the building where the fire suppression system 20 is to be located, a number of occupants 112*c* of the building where the fire suppression system 20 is to be located, a typical building usage 112*c* of the building where the fire suppression system 20 is to be located, types of articles 112*d* within the building where the fire suppression system 20 is to be located, types of hazards 112*e* within the building where the fire suppression system 20 is to be located. It is understood that the input 110 are examples and there may be additional inputs 110 utilized in the systems 100, thus the embodiments of the present disclosure are not limited to the inputs 110 listed.

The floor plans 112*a* of the building where the fire suppression system 20 is to be located may include details about the floors of the building, including, but not limited to, a number of floors within the building, the layout of each floor within the building, the number of rooms on each floor within the building, the height of each room, the organization of each room on each floor within the building, the number of doors within each room, the location of the doors in each room, the number of windows within each room, the location of the windows within each room, the number of heating and ventilation vents within each room, the location of heating and ventilation vents within each room, the number of electrical outlets within each room, and the location of electrical outlets within each room. The address 112*b* of the building where the fire suppression system 20 is to be located may include, but is not limited to, a street address of the building, the geolocation of the building, the climate zone where the building is located, and objects surrounding the building (e.g., water, trees, mountains).

The typical building usage 112*c* of the building where the fire suppression system 20 is to be located may include what the building is being used for such as, for example, lab space, manufacturing, machining, processing, office space, sports, schooling, etc. The types of articles 112*d* within the building where the fire suppression system 20 is to be located may include detail regarding objects within the building and the known flammability of each object such as, for example, if the building is building used to store furniture or paper, which is flammable. The types of hazards 112*e* within the building where the fire suppression system 20 is to be located may include a detailed list of hazards within the building and where the hazards are located. For example, the types of hazards may state that an accelerant (e.g., gasoline) is being stored in the lab space on the second floor. The types of articles 112*d* may be utilized to generate hazards 112*e*. For examples, the articles 112*d* may matter in the determinations of hazards 112*e* for their dimensions because large volume objects may impact in the distribution of the agent 30, quantity required, obstacles, etc.

Building requirements 114 may include but are not limited to building system requirements 114*a* of the building where the fire suppression system 20 is to be located and a desired level of certification 114*b* for the building where the fire suppression system 20 is to be located. The building system requirements 114*a* may include but are not limited to the type of fire suppression system required and/or desired for the building. The desired level of certification 114*b* may include city certification requirements (e.g., local ordinances), state certification requirements (e.g., state laws and regulations), federal certification requirements (e.g., federal laws and regulations), association certification requirements, industry standard certification requirements, and/or trade association certification requirements (e.g., National Fire Protection Association).

The inputs 110 are provided to the optimizer 130. The optimizer 130 may be local, remote, and/or cloud based. The optimizer 130 may be a computer program (e.g., software) that uses different optimization methods and artifacts (e.g., constraint programming) to find an optimal/sub-optimal solutions to the problem specified given the constraints. The optimizer 130 may be a software as a service. The optimizer 130 may be a computing device including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The optimizer 130 is configured to analyze the inputs 110 to produce system type planning 200, nozzle planning 300, piping planning 400, and flow calculations 600 in response to the inputs 130. The optimizer 130 may analyze the inputs 110 in an autonomous and/or semi-autonomous manner. For example, in a semi-autonomous manner, the optimizer 130 may generate multiple different options for the system type planning 200, the nozzle planning 300, the piping planning 400, and the flow calculations 600 for a human user (e.g., designer) to then review and make a selection. In another example, in an autonomous manner, the optimizer 130 may determine a single best option or multiple best options for the system type planning 200, the nozzle planning 300, the piping planning 400, and the flow calculations 600 to then be presented to a human user.

The flow calculations 600 may be a set of agent-based physic functions used to validate the designs. The flow calculations 600 may be uses to validate physical constrains of the fire suppression system 20 design. The flow calculations 600 may include: a computation of the pressure in each point of the pipe 450 across the time during a fire suppression event; the splitting of the flow of fire suppression agent 30 (i.e., how much fire suppression agent 30 gets through each output of the junctions 452); and a time to completely release the fire suppression agent 30. The solutions generated by the select type planning 200, the nozzles planning 300, and the piping planning 400 may need to be validated by the flow calculations 600 to ensure that the solutions comply with the physical constraints (e.g., pressure, flow imbalance, etc) and regulation constraints as the maximum time allowed to release the fire extinguishing agent 30 (e.g., 10.2 seconds).

This validation conducted by the flow calculations 600 can be done posteriori (i.e., after solutions are generated by the select type planning 200, the nozzles planning 300, and the piping planning 400) or the individual functions of the validation process can be applied during the process (i.e., while solutions are generated by the select type planning 200, the nozzles planning 300, and the piping planning 400) to improve the optimization by the optimizer 130. For example, if during piping planning 400, when we are half-way the optimization the pipe 450 design we realize that the design is not feasible due flow constraints found from the flow calculations 600, then the pipe planning 400 may stop designing the current design and move to a different design approach.

The optimizer 130 may organize the system type planning 200, the nozzle planning 300, the piping planning 400, and the flow calculations 600 into outputs 140, including, but not limited to, a building system component list 140a, a component location list 140b for each component on the building system component list 140a, and component specification 140c for each component on the building system component list 140a. A compliance report 140d of the results of the flow calculation 600 specifying the compliance (e.g., with building requirements 114) and different parameters of the process.

The system 100 may also include or be in communication with a fire suppression system component databases 150. The fire suppression system component databases 150 may include details and specifications of components that may be utilized in a fire suppression system 20. The fire suppression system component databases 150 may be a single central repository that is updated either periodically or in real-time. The fire suppression system component databases 150 may also link to outside databases in real-time, such as, for example online supplier databases of components for a fire suppression system 20. The fire suppression system component databases 150 may include an agent database 150a, a nozzle database 150b, and a piping database 150c.

The agent database 150a may include information such as the types of fire suppression agents 30 that may be utilized and performance characteristics of each fire suppression agents 30. For example, the agent database 150a may include information including but not limited to the amount of agent required per volume and temperature, the weight of the fire suppression agent 30, the price of the fire suppression agent 30, and what hazards 112e the fire suppression agents 30 may be used against. The nozzle database 150b may include information such as the types of nozzles 350 that may be utilized and performance characteristics of each nozzle 350. For example, the nozzle database 150b may include but is not limited to the types of nozzles 350 (e.g., 360°, 180°, 90°), material of each nozzle 350 (e.g., brass, iron, etc.), orifice dimeters of each nozzle 350, a max amount of fire suppression agent 30 release of each nozzle 35, a cost of each nozzle 350, a coverage of each nozzle 35, a weight of each nozzle 35, and dimensions of each nozzle 35. The performance characteristics of each nozzle 350 may include max agent discharge capacity, angular range of spray (e.g., 360°, 180°), nozzle 350 coverage (e.g., radius, Length×Width), a minimum distance between two nozzles 350, a minimum distance between a nozzle 350 and a wall (e.g., a 360° nozzle 350 and a wall), and a maximum height coverage of a nozzle 350. The piping database 150c may include information such as the types of pipes that may be utilized, performance characteristics of each pipe, the type of connectors that may be utilized, and the performance characteristics of the connectors.

Figure 2:
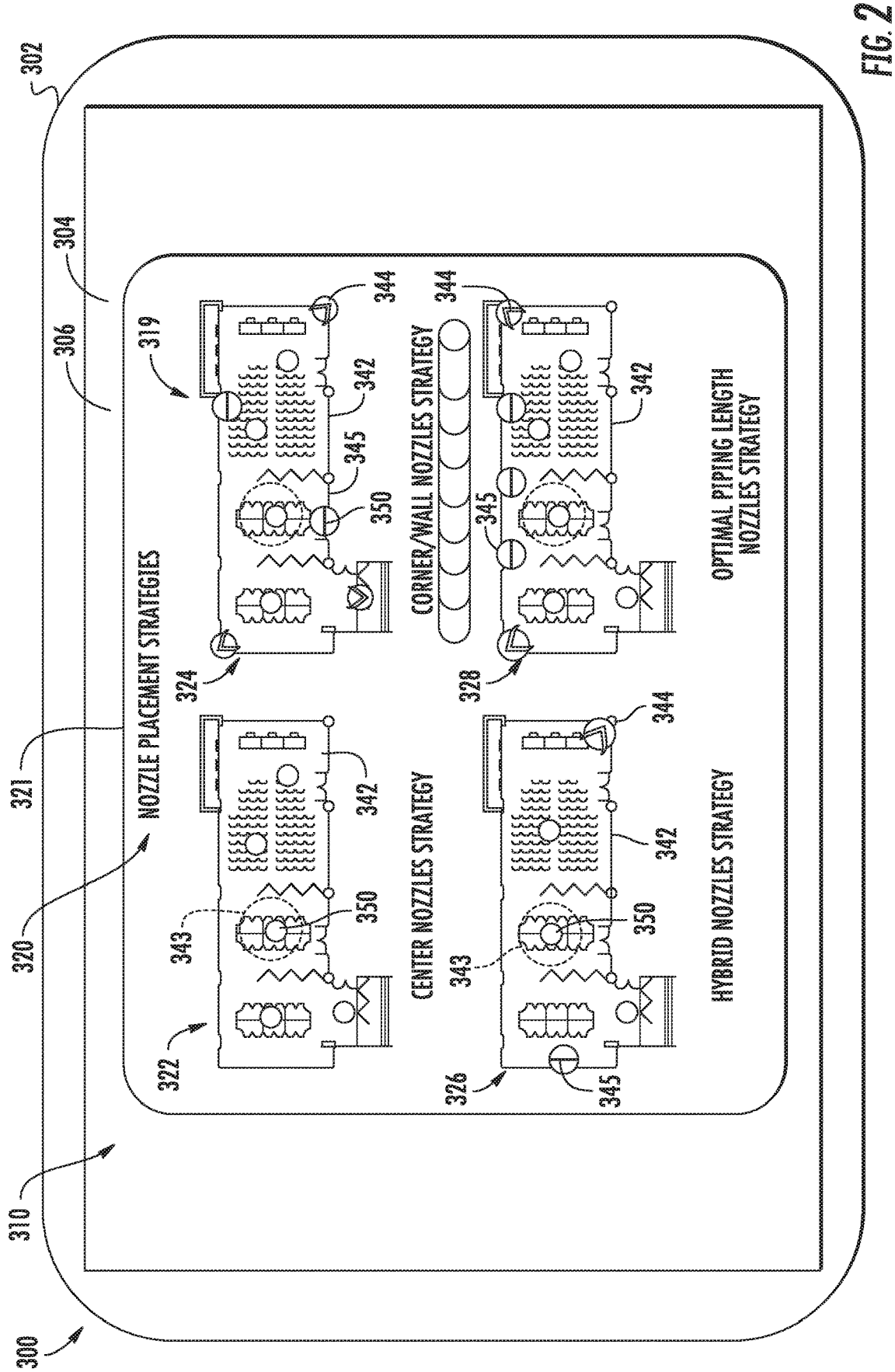
FIG. 2 is a schematic illustration of a nozzle planning tool, in accordance with an embodiment of the disclosure.
Figure 3:
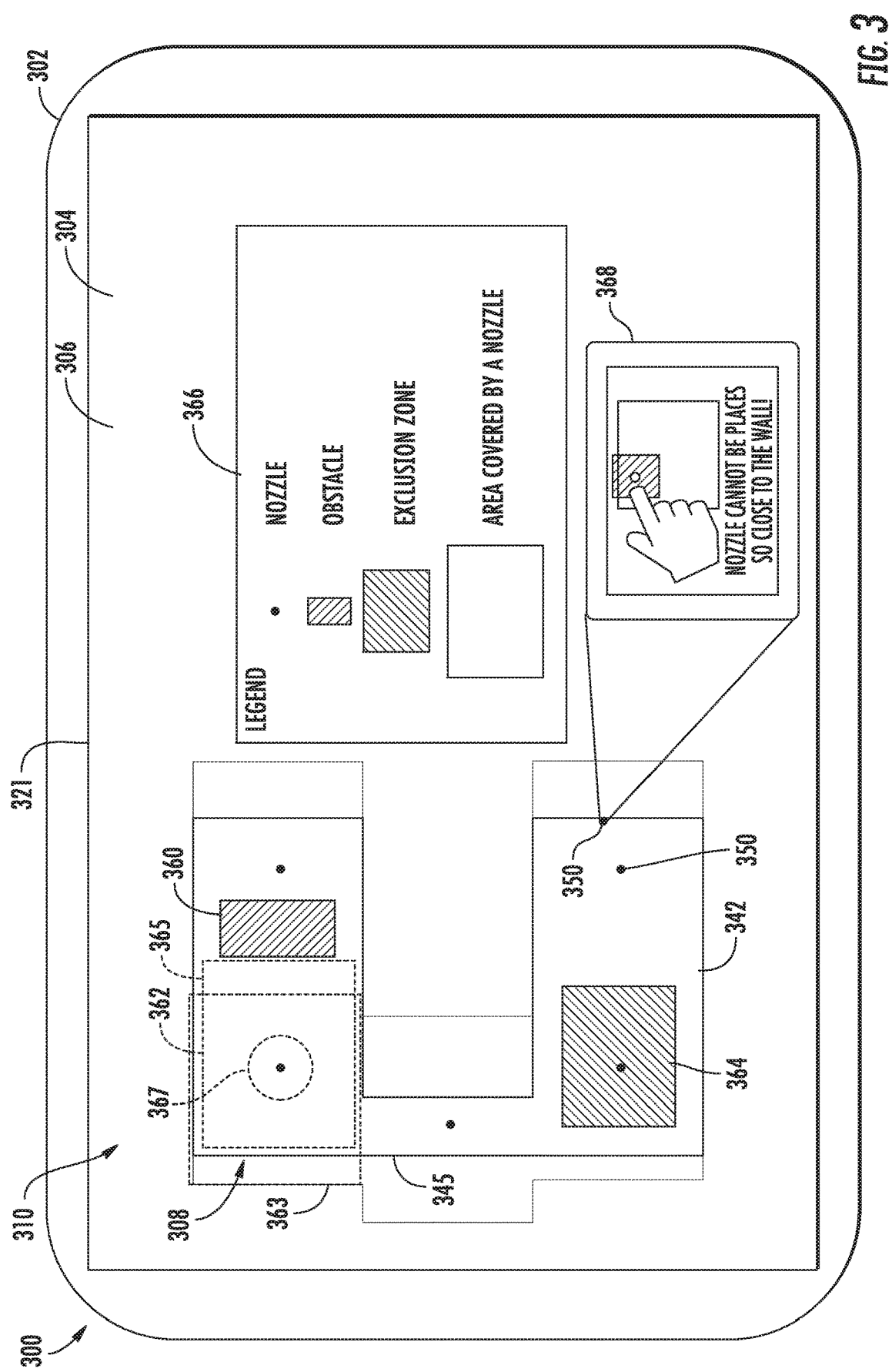
FIG. 3 is a schematic illustration of a nozzle planning tool, in accordance with an embodiment of the disclosure.

Referring now to FIGS. 2 and 3, with continued reference to FIG. 1, which show the nozzle planning 300 of FIG. 1. FIG. 2 illustrates a nozzle planning tool 310 that may be operable by a user through a computing device 302. The nozzle planning tool 310 may be a software application associated with the optimizer 130. The computing device 302 may be a desktop computer, laptop computer, smart phone, tablet computer, smart watch, or any other computing device known to one of skill in the art. In the example shown in FIG. 3, the computing device 302 is a tablet computer. The computing device 302 may include a display screen 304 and an input device 306, such as, example, a mouse, a touch screen, a scroll wheel, a scroll ball, a stylus pen, a microphone, a camera, etc. In the example shown in FIG. 3, since the computing device 302 is a tablet computer, then the display screen 304 may also function as an input device 306.

The nozzle planning tool 310 is configured to aid a designer/user through a process of nozzle placement by providing real-time feedback during the design process. As shown in FIG. 2, the nozzle planning tool 310 may allow a user to select a nozzle placement strategy 320 through a user interface 321 or the nozzle planning tool 310 may automatically select a nozzle placement strategy 320. The nozzle planning tool 310 may display one or more nozzle placement strategies 322, 328, along with associated images 319 depicting the nozzle placement strategy 320 for the user to select from. As shown in FIG. 2, the nozzle placement strategies 320 may include but are not limited to a center nozzle strategy 322, a corner and wall nozzle strategy 324, a hybrid nozzle strategy 326, and a piping length nozzle strategy 328.

The center nozzle strategy 322 will strategically locate nozzles 350 for a fire suppression system 20 in central locations 343 within a room 342. The nozzles 350 located proximate central locations 343 of the room 342 may be configured to spray in 360°. The corner and wall nozzle strategy 324 will strategically locate nozzles 350 for a fire suppression system 20 within a room 342 proximate a corner 344 of the room 342 or a wall 345 of the room 342. The nozzles 350 within a room 342 located proximate a corner 344 of the room 342 or a wall 345 of the room 342 may be configured to spray in a specific direction within the room 342. The nozzles 350 located proximate a corner 344 of the room 342 may be configured to spray in 90°. The nozzles 350 located proximate a wall 345 of the room 342 may be configured to spray in 180°. The hybrid nozzle strategy 326 may include a combination of different nozzles 350 located proximate central locations 343 within a room, corners 344 of the room 342, and/or walls 345 of the room 342. The piping length nozzle strategy 328 incorporates different locations for the nozzles 350 in order to create the piping length and may include a combination of different nozzles located proximate central locations 343 within a room, corners 344 of the room 342, and/or walls 345 of the room 342.

As shown in FIG. 3, once the user has selected a nozzle placement strategy 320 or the nozzle planning tool 310 has automatically selected a nozzle placement strategy 320, the nozzle planning tool 310 may, utilizing the floor plans 112a, automatically place nozzles 350 throughout a map 308 of the room 342, which is displayed on the display screen 304. The floor plan 112a may also incorporate obstacles 360 or articles 112d in a map 308. The nozzle planning tool 310 is also configured to determine and a nozzle spray coverage area 362 for each nozzle 350 on the map 308. The nozzle spray coverage area 362 may further be broken down into a spray coverage radius 361 and an agent coverage area 363 (diffusion based). The nozzle planning tool 310 is also configured to determine and display an obstruction free area 365 around a nozzle 350 (i.e., no wall 345 or obstacle 360). The obstacles 360 may impede the fire suppression agent 30 spray from the nozzles 360 and thus are accounted for by the nozzle planning tool 310 when calculating and displaying the nozzle spray coverage area 362. The floor plan 112a may also incorporate exclusion zones 364 in a map 308. Exclusion zones 364 may be where fire suppression agent 30 is not allowed to be sprayed in accordance with the floor plan 112a and the articles 112d located within the room 342. As shown in FIG. 3, the map 308 may also include a legend 366 to help explain the map 308.

The map 308 is interactive in real-time and a user will be able to move the nozzles 350 around on the map 308 by interacting the map 308, such as for example, by "drag and drop" or by touch. The nozzle planning tool 310 is configured to activate an alert 368 if movement of the nozzle 350 violates a constraint such as for example a building requirements 114 or nozzle constraint. The nozzle constraints may include at least one of a distance between two of the nozzles 350, a distance between one of the nozzles 350 and a wall 345, and height of a nozzle 350 in the room 342. For example, placing a nozzle 350 too close to a wall 345 may activate an alert 368. Other example alerts 368 may include, that two nozzles 350 are located too close together or that a nozzle 350 is too high in a room 342. Another example alerts if the user try to use less nozzles than the minimum required base on the agent constraints Advantageously, the map 308 serves as a visualization aid that informs the user (i.e., designer) in real-time of the specific constraints and whether the constraints are violated during modification by the user.

Figure 4:
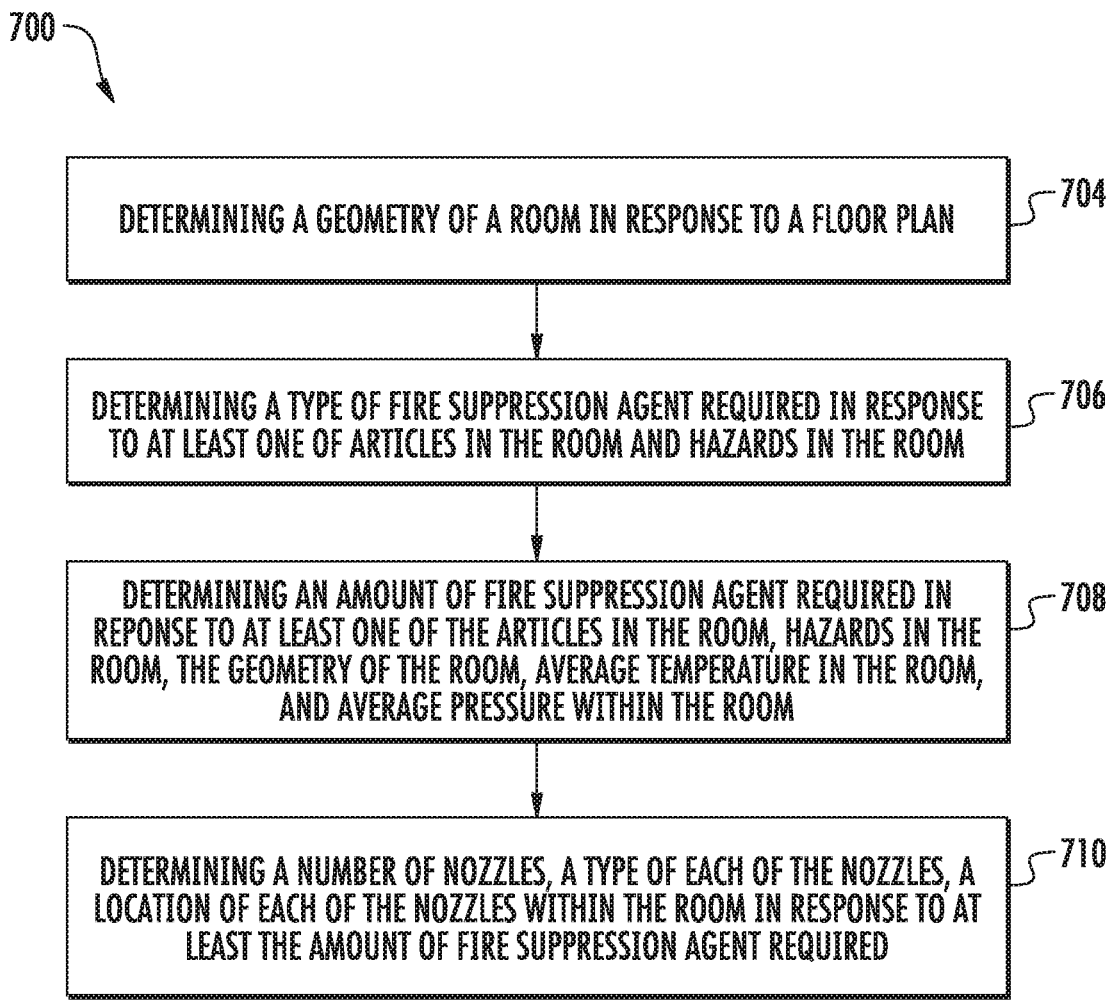
FIG. 4 is a flow diagram illustrating a method of determining placement of nozzle using the nozzle planning tool of FIGS. 2 and 3, in accordance with an embodiment of the disclosure.

Referring now also to FIG. 4 with continued reference to FIGS. 1-3. FIG. 4 shows a flow diagram illustrating a method 700 of determining placement of nozzle 350 using the nozzle planning tool 310. At block 704, the nozzle planning tool 310 determines a geometry of a room 342 in response to a floor plan 342 of the room 112a. The geometry of the room 342 may include the geometric dimensions of the room 342 including length, width, height, and walls 345. At block 706, the nozzle planning tool 310 determines a type of fire suppression agent 30 required in response to at least one of articles 112d in the room 342 and hazards 112e in the room 342. The nozzle planning tool 310 may query the agent database 150 to select a fire suppression agent 30. At block 708, an amount of fire suppression agent 30 required is determined in response to at least one of the articles 112d in the room 342, hazards 112e in the room 342, the geometry of the room 342, average temperature within the room 342 (e.g., or location), and average pressure within the room 342 (e.g., or location). The nozzle planning tool 310 may query the agent database 150 to determine performance characteristics of the fire suppression agent 30. At block 710, a number of nozzles 350, a type of each of the nozzles 350, a location of each of the nozzles 350 within the room 342 is determined in response to at least the amount of fire suppression agent 30 required. The determined number of nozzles 350, the type of each of the nozzles 350, and the location of each of the nozzles 350 within the room 342 may be enough to cover the whole room 342 or other selected area. Additionally, the determined number of nozzles 350, the type of each of the nozzles 350, the location of each of the nozzles 350 within the room 342 may be enough to satisfy the minimum of a requirement or constraint (e.g., building requirements 114).

The nozzle planning tool 310 may query the nozzle database 150b to select a nozzle 350. The method 700 may further comprise: determining nozzle placement strategy 320 including at least one of a center nozzle strategy 322, a corner and wall nozzle strategy 324, a hybrid nozzle strategy 326, and a piping length nozzle strategy 328; and then a location of each of the nozzles 350 within the room 342 is determined in response to the amount of fire suppression agent 30 required and the nozzle placement strategy 320.

The method 700 may further comprise: determining whether at least one of the number of nozzles 350, the type of each of the nozzles 350, the location of each of the nozzles 350 within the room 342 violates a nozzle constraint and activating an alert 368 when at least one of the number of nozzles 350, the type of each of the nozzles 350, the location of each of the nozzles 350 within the room 342 violates a nozzle constraint. The method 700 may also comprise: receiving an input from a user adjusting at least one of the number of nozzles 350, the type of each of the nozzles 350, and the location of each of the nozzles 350 within the room 342. An alert 368 may also be activated if one of the adjustments by the user violates a nozzle constraint.

While the above description has described the flow process of FIG. 4 in a particular order, it should be appreciated that unless otherwise specifically required in the attached claims that the ordering of the steps may be varied.

Figure 5:
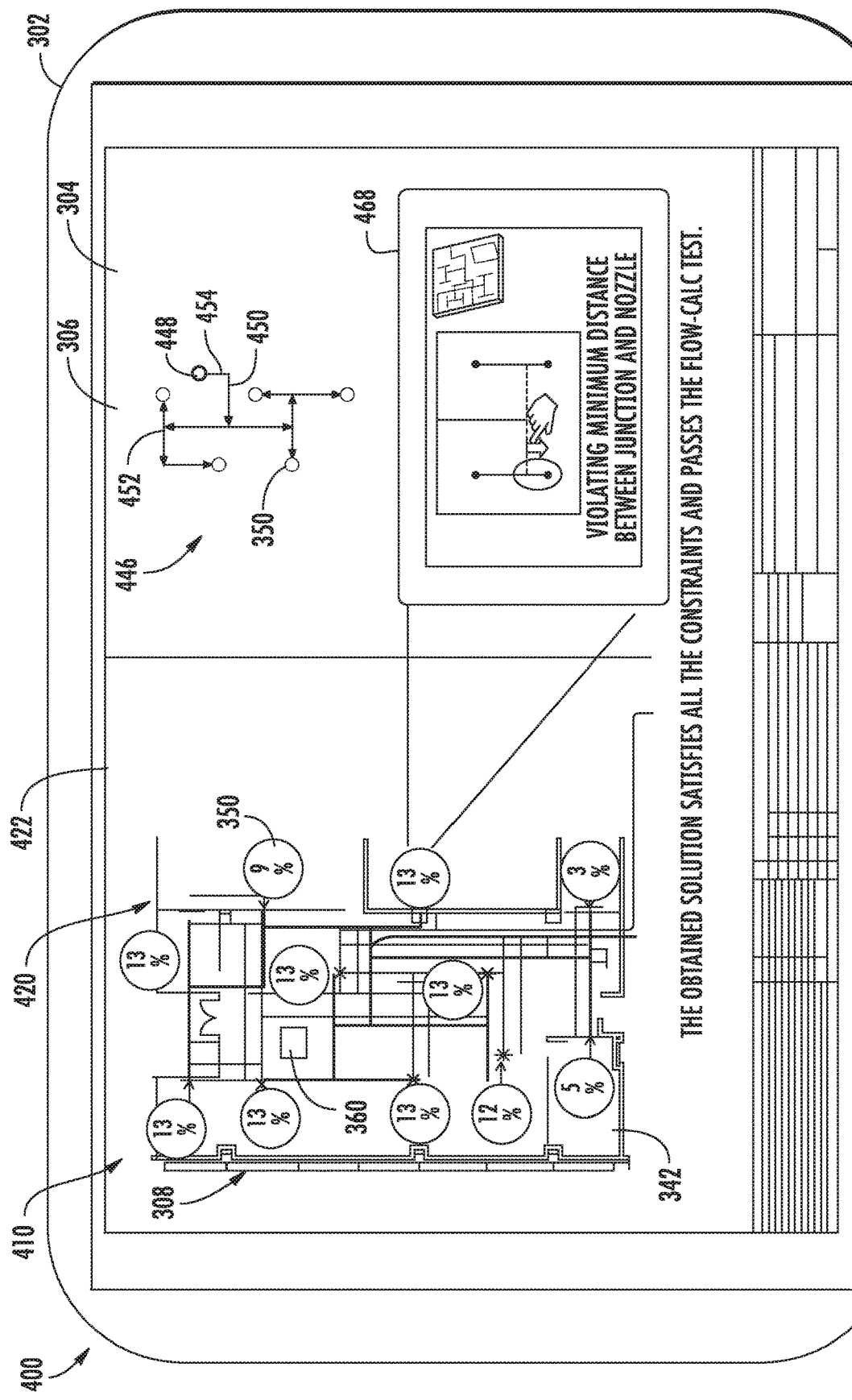
FIG. 5 is a schematic illustration of a piping planning tool, in accordance with an embodiment of the disclosure.

Referring now to FIG. 5, with continued reference to FIGS. 1-4, which show the piping planning 400 of FIG. 1. FIG. 5 illustrates a piping planning tool 310 that may be operable by a user through a computing device 302. The piping planning tool 410 may be a software application associated with the optimizer 130. The computing device 302 may be a desktop computer, laptop computer, smart phone, tablet computer, smart watch, or any other computing device known to one of skill in the art. In the example shown in FIG. 5, the computing device 302 is a tablet computer. The computing device 302 may include a display screen 304 and an input device 306, such as, example, a mouse, a touch screen, a scroll wheel, a scroll ball, a stylus pen, a microphone, a camera, etc. In the example shown in FIG. 5, since the computing device 302 is a tablet computer, then the display screen 304 may also function as an input device 306.

The piping planning tool 410 is configured to aid a designer/user through a process of piping layout design by providing real-time feedback during the design process. As shown in FIG. 5, the piping planning tool 410 may allow a user to select a piping layout design 420 through a user interface 422 or the piping planning tool 410 may automatically select a piping layout design 420. The locations of the nozzles 350 may be determined by the nozzle planning tool 310 concurrently with or in advance of the piping planning tool 410 determining the piping layout design 420. The piping planning tool 410 may utilizing display one or more pipe layout strategies along with associated images depicting the pipe layout strategies for the user to select from. The pipe layout strategy shown in FIG. 5 is a pipe balancing strategy 446. The pipe balancing strategy 446 may attempt to balance the length of pipe 450 between a fire suppression agent source 448 and each nozzle 350, so that the distance that a fire suppression agent 30 travels from the fire suppression agent source 448 to each nozzle is about equal. The pipe balancing strategy 446 may also attempt to balance the number of junctions 452 and/or elbows 454 between a fire suppression agent source 448 and each nozzle 350, so that the number of junctions 452 and/or elbows 454 a fire suppression agent 30 travels through from the fire suppression agent source 448 to each nozzle is about equal. The pipe balancing strategy 446 may also attempt to balance the geometry of pipes 450 between a fire suppression agent source 448 and each nozzle 350, so that the geometry of pipes 450 that a fire suppression agent 30 travels through from the fire suppression agent source 448 to each nozzle 350 is about equal. The piping planning tool 410 may strategically locate pipes 450 for a fire suppression system 20 to carry out a selected pipe balancing strategy 446. The pipe balancing strategy 446 may be automatically selected by the piping planning tool 410 or the pipe balancing strategy 446 may be select manually by a user.

The floor plan 112a may also incorporate obstacles 360, walls 342, and/or articles 112d in a map 308, which may impede pipes 450 and are thus accounted for by the piping planning tool 410 when calculating and displaying piping layout design 420. For example, walls 342 that are fire walls may prevent pipe 450 from passing through the wall 342.

As shown in FIG. 5, the piping planning tool 410 may, utilizing the floor plans 112a, automatically place pipes 450 throughout a map 308 of the room 342 interconnecting nozzles 350, which is displayed on the display screen 304. The map 308 is interactive in real-time and a user will be able to move the pipes 350 around on the map 308 by interacting the map 308, such as for example, by "drag and drop" or by touch. The piping planning tool 410 is configured to activate an alert 468 if movement of the pipe 450 violates a building requirements 114, piping constraints saved in the piping databases 150c. Piping constraints may include: placing junctions 452 of a pipe 450 too close to a nozzle 350 may activate an alert 468. Other example alerts 468 may include, that two nozzles 350 are located too close together because a length of a pipe 450 is too short. Other alerts 468 may include: a piping components compatibility check, a piping elements options base on a previous/posterior element, areas where pipes 450 cannot be placed due obstacles and other elements, guidance about which set of nozzles 350 to pipe to first, and assistance on soft physical constraints as agent flow split or minimum pipe size.

Piping constraints may include physics driven piping constraints, regulation driven piping constraints, and/or geometry driven piping constraints. A physics driven piping constraint may include a flow split constraint, such as, for example "an outgoing flow for a side tee should be between 10-30%" or "an outgoing flow for a bull-head tee should be within 30-70%". A regulation driven piping constraint may include a physics driven constraint, a pressure constraint, an arrival time constraint, and/or a runout-time constraint. In an example, a pressure constraint may be that "the pressure of the nozzles 350 must be above a threshold" or "the range of pressure of nozzles 350 must be less than a threshold." In an example, an arrival time constraint may be that "the arrival time difference between two nozzles 350 must be less than a certain threshold (e.g., 1.3 second)". In an example, a runout-time constraint may be that "the runout-time difference between two nozzles must be less than a certain threshold (e.g., 2.2 second)" of the maximum runout time must be less than 10 secs. Geometry constraints may include no interference constraints and/or heuristic/soft constraints. In an example, no interference constraints may include that "pipes 450 do not cross". In an example, heuristic/soft constraints may include "a maximum number of elbows and other components" or "to minimize the difference in distances from the fire suppression agent source 448 to each nozzle 350".

Advantageously, the map 308 serves as a visualization aid that informs the user (i.e., designer) in real-time of the specific constraints and whether the constraints are violated during modification by the user.

Figure 6:
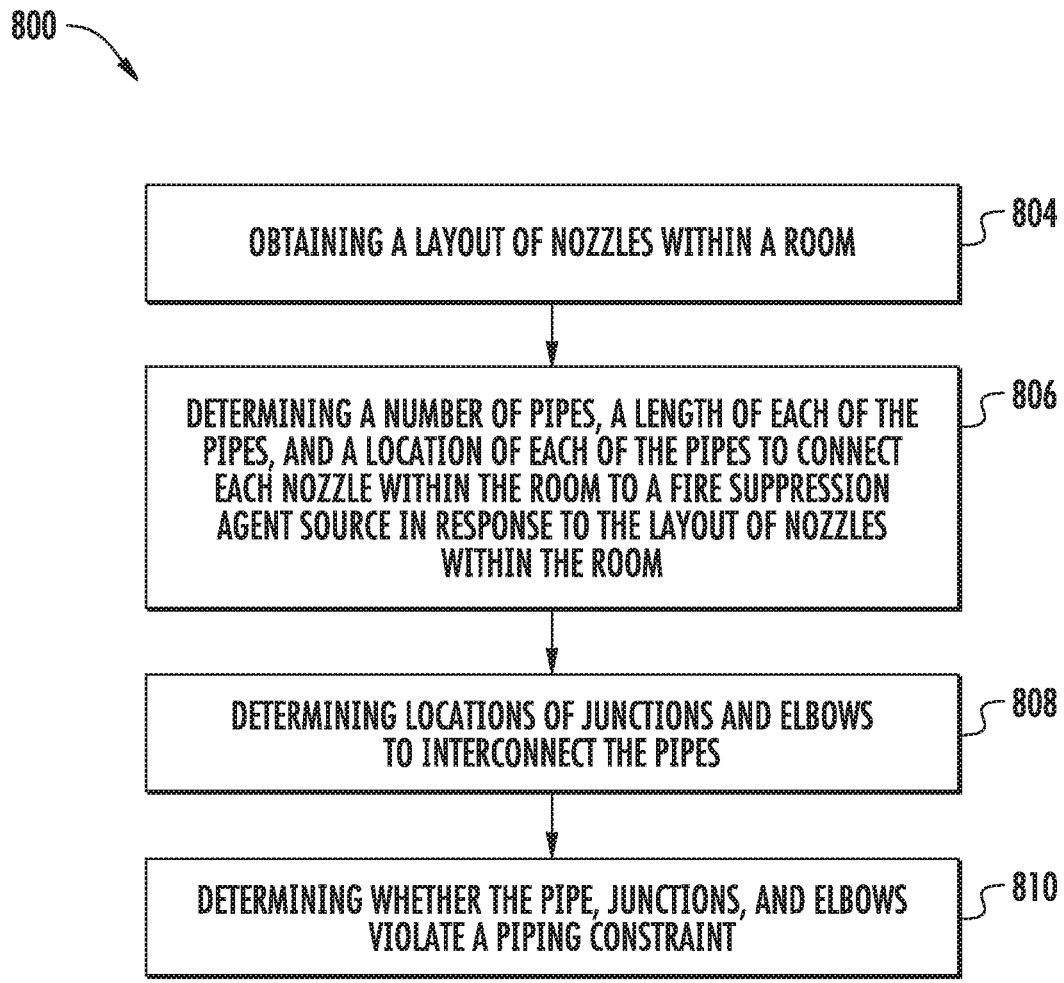
FIG. 6 is a flow diagram illustrating a method of determining placement of nozzle using the piping planning tool of FIG. 5, in accordance with an embodiment of the disclosure.

Referring now also to FIG. 6 with continued reference to FIGS. 1-5. FIG. 6 shows a flow diagram illustrating a method 800 of determining placement of pipes 450 within a fire extinguishing system 20 using the piping planning tool 410. At block 804, the pipe planning tool 410 may obtain a layout of nozzles 350 within a room 342. Block 806 may occur after method 700 is completed or block 806 may occur concurrently with method 700 with the rearrangement of pipes 450 and nozzles 350. At block 806, a number of pipes 450, a length of each of the pipes 450, and a location of each of the pipes 450 to connect each nozzle 350 within the room to a fire suppression agent source 448 in response to the layout of nozzles 350 within the room 342. At block 808, a location of junctions 452 and elbows 454 to interconnect the pipes 450 are determined. At block 810, it is determined whether the locations of the pipes 450, the junctions 452, and the elbows 454 violate a piping constraint.

The method 800 may further comprise: activating an alert 468 when at least one of the pipe 450, junctions 452, and elbows 454 violate a piping constraint. The method 800 may also comprise: receiving an input from a user adjusting at least one of the number of pipes 450, a length of at least one of the pipes 450, and a location of at least one of the pipes 450 and an alert 468 may be activated if the adjustment violates one of the piping constraints.

While the above description has described the flow process of FIG. 6 in a particular order, it should be appreciated that unless otherwise specifically required in the attached claims that the ordering of the steps may be varied.

Figure 7:
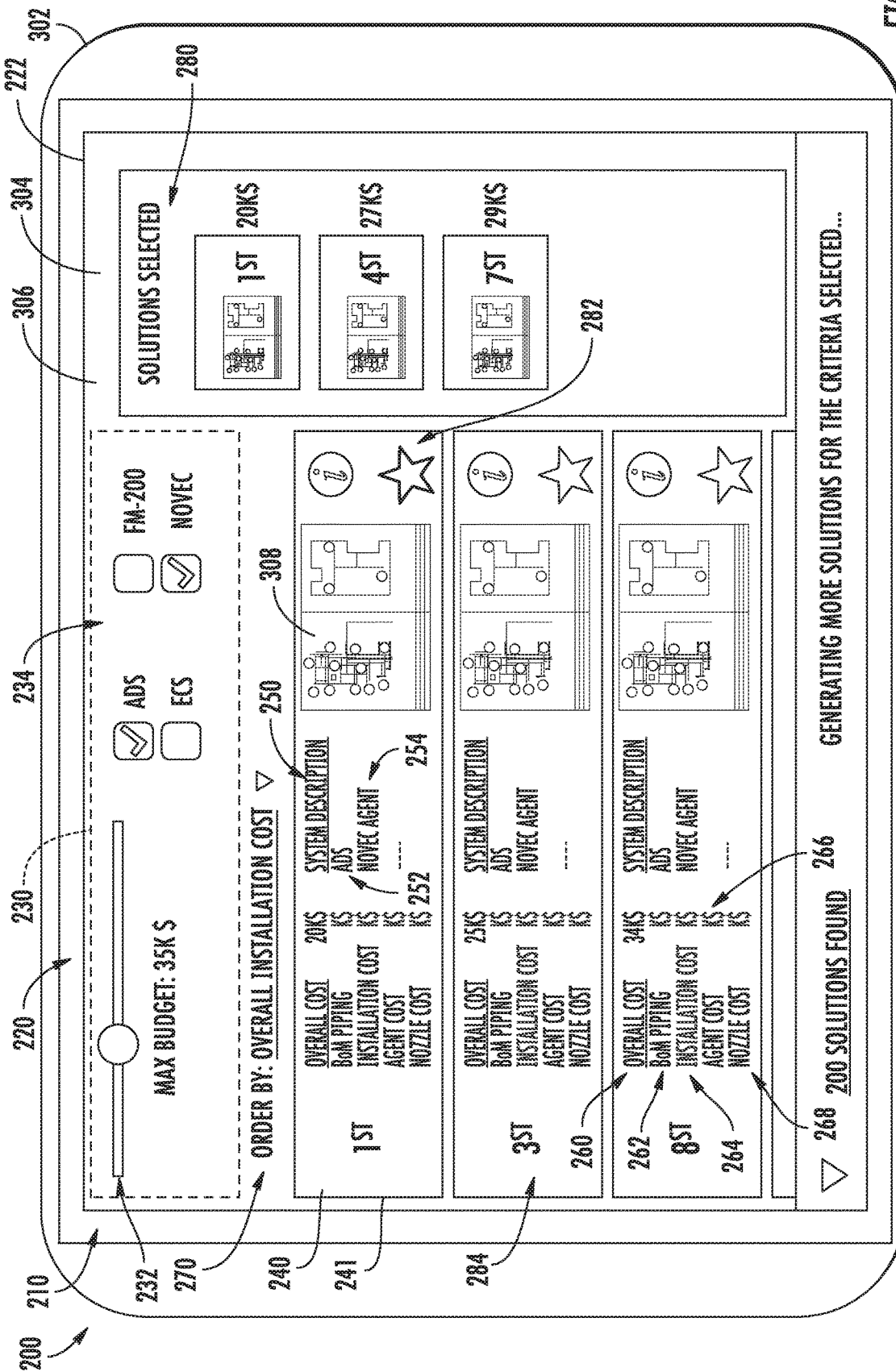
FIG. 7 is a schematic illustration of a fire suppression system design tool, in accordance with an embodiment of the disclosure.

Referring now to FIG. 7, with continued reference to FIGS. 1-6, which shows the systems type planning of FIG. 1 using a fire suppression system design tool 210 that may be operable by a user through a computing device 302. The fire suppression system design tool 210 may be a software application associated with the optimizer 130. The computing device 302 may be a desktop computer, laptop computer, smart phone, tablet computer, smart watch, or any other computing device known to one of skill in the art. In the example shown in FIG. 7, the computing device 302 is a tablet computer. The computing device 302 may include a display screen 304 and an input device 306, such as, example, a mouse, a touch screen, a scroll wheel, a scroll ball, a stylus pen, a microphone, a camera, etc. In the example shown in FIG. 7, since the computing device 302 is a tablet computer, then the display screen 304 may also function as an input device 306.

The fire suppression system design tool 210 is configured to aid a designer/user through a process of a fire suppression system design by providing real-time feedback during the design process. As shown in FIG. 7, the fire suppression system design tool 210 may allow a user to enter in a series of several different fire suppression system parameters 430 and the fire suppression system design tool 210 is then configured to design and display one or more fire suppression system designs 240 for the user to select. The fire suppression system design tool 210 may be configured to automatically design and display one or more fire suppression system designs 240 utilizing the nozzle planning tool 310 and the piping planning tool 410.

As shown in FIG. 7, the fire suppression system design tool 210 is configured to present a user with one or more different fire suppression system parameters 230 to choose from in a user interface 222. The fire suppression system parameters 230 may include a monetary maximum budget 232 and fire suppression configuration type 234. The monetary maximum budget 232 may be the maximum overall cost that a user would like to spend on the fire suppression system, which may include piping costs, agent costs, nozzle costs, and installation costs. The fire suppression configuration type 234 may provide the user options to select different fire suppression configuration types 234, including, but not limited to advanced delivery system (ADS), ECS, FM-200, and Novec.

The fire suppression system design tool 210 is configured to determine one or more fire suppression system designs 240 in response to the fire suppression system parameters 230 that the user selected, which would be an outputs 140 of FIG. 1. Each fire suppression system designs 240 may include a map 308 of the fire suppression system designs 240, a general system description 250, and a breakdown of overall costs 260. The map 308 may include locations of each nozzle 350 and pipe 450 of the fire suppressions system design 240 within a room 342. As shown in FIG. 7, the general system description 250 may include but is not limited to a system type 252 (e.g., similar to the fire suppression configuration type 234), and a fire suppression agent type 254. As shown in FIG. 7, the breakdown of overall costs 260 may include but is not limited to piping costs 262, agent costs 266, nozzle costs 268, and installation costs 264 for the fire suppression system design 240. Using the fire suppression system design tool 210 the user will be able to scroll through different fire suppression system designs 240 and quickly review the map 308 of the fire suppression system designs 240, the general system description 250, and the breakdown of overall costs 260. The user may be able to sort the fire suppression system designs 240 in a specific order using a sort feature 270. For example, the user may be able to sort the fire suppression system designs 240 by the overall costs 260. The fire suppression system designs 240 may each have a rank 284 within a ranking system. The ranking system may rank 284 each fire suppression system designs 240 according to the "best design" which fire suppression system designs 240 qualifies as the best design may be based up cost with respect to fire suppression system parameters 230 selected by the user. Some of the best rankings might not show up if some of the fire suppression system designs 240 have been filtered out by the fire suppression system parameters 230 selected by the user.

The user may select a specific fire suppression system design 240 to get additional information regarding the specific fire suppression system designs 240. For example, the user may select anywhere on the box 241 for the fire suppression system designs 240 to get the additional information. In another example, the user may select the information icon 243 to get the additional information. The additional information may include a building system component list 140*a*, a component location list 140*b*, and component specifications 140*c*. The building system component list 140*a* may include a cost of each individual component in the fire suppression system designs 240 (e.g., nozzles 350, pipes 440, junctions 452, elbows 454, agent, etc.). As shown in FIG. 7, the fire suppression system design tool 210 may allow a user to select a fire suppression system design 240 to add to a favorites list 280 for later review. The user may select a fire suppression system design 240 to add to a favorites list 280 by selecting a star 282 icon within the box 241 for the fire suppression system designs 240.

Advantageously, the fire suppression system design tool 210 serves as a visualization aid that allows the user (i.e., designer) to generate multiple different fire suppression system designs 240 in real-time to evaluate and compare.

Figure 8:
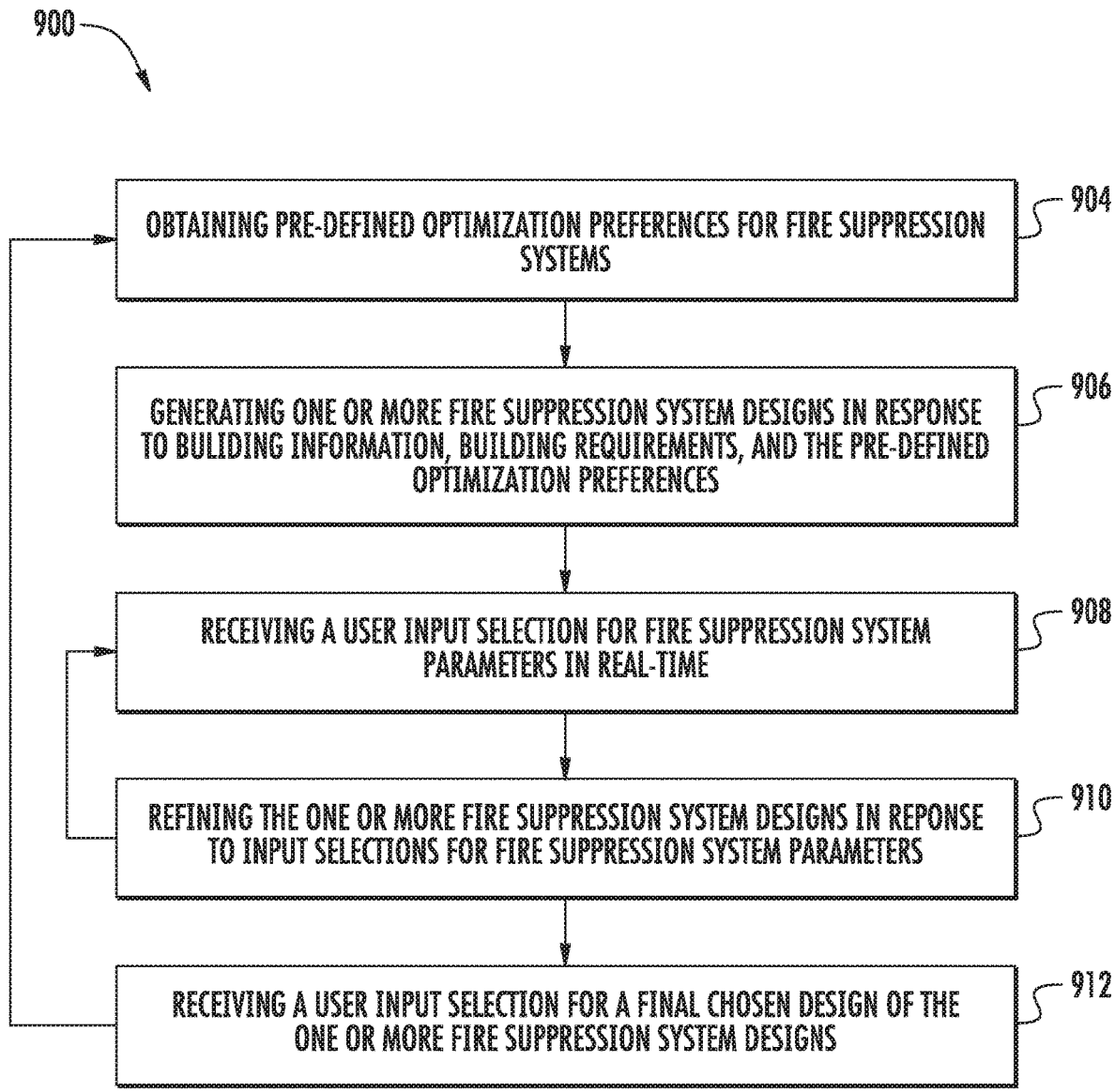
FIG. 8 is a flow diagram illustrating a method of designing a fire suppression systems using the fire suppression system design tool of FIG. 7, in accordance with an embodiment of the disclosure.

Referring now also to FIG. 8 with continued reference to FIGS. 1-7. FIG. 8 shows a flow diagram illustrating a method 900 of selecting a fire suppression system design 240 using the fire suppression system design tool 210.

At block 904, pre-defined optimization preferences for a fire suppression systems 20 are obtained. The pre-defined optimization preferences may include what type of fire suppression system 20 to design, including but not limited to an ADS system or an ECS system. For example, an ADS system may be used in MID to large sized areas, whereas and ECS system may be used for small to medium areas. In limiting embodiment, the pre-defined optimization preference may be an ECS system for small buildings, an ADS system for large buildings and an optimization of both an ECS system and an ADS system for a medium building. At block 906, one or more fire suppression system designs 240 are generated in response to building information 112, building requirements 114, and the pre-defined optimization preferences. The one or more fire suppression system designs 240 may be displayed on a computing device 302 from viewing by the user. At block 908, a user input selection for fire suppression system parameters 230 is received in real-time. The user input may be a touch or click on the input device 306 of the computing device 302.

At block 910, refining the one or more fire suppression system designs 240 in response to input selections for fire suppression system parameters 234. The refining may hide some of the fire suppression system designs 240 from being displayed on the display screen 304 of the computing device 302. The method 900 may loop between block 910 and 908, depending upon how many input selections are received from the user. For example, the list of the one or more fire suppression system designs 240 may be continued to be refined with each user input selection received. At block 912, a user input selection for a final chosen design of the one or more fire suppression system designs 240 is received.

While the above description has described the flow process of FIG. 8 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of designing a fire suppression system, the method comprising:
   determining nozzle placement for nozzles of a fire suppression system within a location;
   determining piping placement for pipes of the fire suppression system within the location;
   determining whether the nozzle placement or piping placement violate a constraint; and
   generating a map displaying the nozzle placement and the piping placement on a computing device;
   activating an alert when at least one of the nozzle placement and the piping placement violate a constraint;
   wherein determining nozzle placement for nozzles of a fire suppression system within a location further comprises:
   determining a geometry of a location in response to a floor plan;
   determining a type of fire suppression agent required in response to at least one of articles in the location and hazards in the location;
   determining an amount of fire suppression agent required in response to at least one of the articles in the location, hazards in the location, the geometry of the location, average temperature of the location, and average pressure of the location; and
   determining a number of nozzles, a type of each of the nozzles, a location of each of the nozzles within the location in response to the amount of fire suppression agent required.

2. The method of claim 1, further comprising:
   receiving an input from a user adjusting at least one of the nozzle placement and the piping placement.

3. The method of claim 2, wherein after receiving an input from a user, the method further comprises:
   determining whether the nozzle placement or piping placement violate a constraint; and
   activating an alert when at least one of the nozzle placement and the piping placement violate a constraint.

4. The method of claim 1, wherein the constraints include at least one of a building system requirement, a desired level of certification requirement, a nozzle constraint, and a piping constraint.

5. A method of designing a fire suppression system, the method comprising:
   determining nozzle placement for nozzles of a fire suppression system within a location;
   determining piping placement for pipes of the fire suppression system within the location;
   determining whether the nozzle placement or piping placement violate a constraint; and
   generating a map displaying the nozzle placement and the piping placement on a computing device;
   activating an alert when at least one of the nozzle placement and the piping placement violate a constraint;
   wherein determining piping placement for pipes of the fire suppression system within the location further comprises:
   obtaining a layout of nozzles within a location for a fire suppression system;
   determining a number of pipes, a length of each of the pipes, and a location of each of the pipes to connect each nozzle within the location to a fire suppression agent source in response to the layout of nozzles within the location;
   determining locations of junctions and elbows to interconnect the pipes; and
   determining whether the pipe, junctions, and elbows violate a piping constraint.

6. A system for designing a fire suppression system, the system comprising:
   a processor; and
   a memory comprising computer-executable instructions that, when executed by the processor, cause the processor to perform operations, the operations comprising:
   determining nozzle placement for nozzles of a fire suppression system within a location;
   determining piping placement for pipes of the fire suppression system within the location;
   determining whether the nozzle placement or piping placement violate a constraint; and
   generating a map displaying the nozzle placement and the piping placement on a computing device;
   activating an alert when at least one of the nozzle placement and the piping placement violate a constraint;
   wherein determining nozzle placement for nozzles of a fire suppression system within a location further comprises:
   determining a geometry of a location in response to a floor plan;

determining a type of fire suppression agent required in response to at least one of articles in the location and hazards in the location;

determining an amount of fire suppression agent required in response to at least one of the articles in the location, hazards in the location, the geometry of the location, average temperature of the location, and average pressure of the location; and determining a number of nozzles, a type of each of the nozzles, a location of each of the nozzles within the location in response to the amount of fire suppression agent required.

7. The system of claim 6, wherein the operations further comprise:

receiving an input from a user adjusting at least one of the nozzle placement and the piping placement.

8. The system of claim 7, wherein after receiving an input from a user, the method further comprises:

determining whether the nozzle placement or piping placement violate a constraint; and activating an alert when at least one of the nozzle placement and the piping placement violate a constraint.

9. The system of claim 6, wherein the constraints include at least one of a building system requirement, a desired level of certification requirement, a nozzle constraint, and a piping constraint.

10. A system for designing a fire suppression system, the system comprising:

a processor; and a memory comprising computer-executable instructions that, when executed by the processor, cause the processor to perform operations, the operations comprising:

determining nozzle placement for nozzles of a fire suppression system within a location;

determining piping placement for pipes of the fire suppression system within the location;

determining whether the nozzle placement or piping placement violate a constraint; and generating a map displaying the nozzle placement and the piping placement on a computing device;

activating an alert when at least one of the nozzle placement and the piping placement violate a constraint;

wherein determining piping placement for pipes of the fire suppression system within the location further comprises:

obtaining a layout of nozzles within a location for a fire suppression system;

determining a number of pipes, a length of each of the pipes, and a location of each of the pipes to connect each nozzle within the location to a fire suppression agent source in response to the layout of nozzles within the location;

determining locations of junctions and elbows to interconnect the pipes; and determining whether the pipe, junctions, and elbows violate a piping constraint.

11. A computer program product tangibly embodied on a non-transitory computer readable medium, the computer program product including instructions that, when executed by a processor, cause the processor to perform operations comprising:

determining nozzle placement for nozzles of a fire suppression system within a location;

determining piping placement for pipes of the fire suppression system within the location;

determining whether the nozzle placement or piping placement violate a constraint; and generating a map displaying the nozzle placement and the piping placement on a computing device;

activating an alert when at least one of the nozzle placement and the piping placement violate a constraint;

wherein determining nozzle placement for nozzles of a fire suppression system within a location further comprises:

determining a geometry of a location in response to a floor plan;

determining a type of fire suppression agent required in response to at least one of articles in the location and hazards in the location;

determining an amount of fire suppression agent required in response to at least one of the articles in the location, hazards in the location, the geometry of the location, average temperature of the location, and average pressure of the location; and determining a number of nozzles, a type of each of the nozzles, a location of each of the nozzles within the location in response to the amount of fire suppression agent required.

12. The computer program product of claim 11, wherein the operations further comprise:

receiving an input from a user adjusting at least one of the nozzle placement and the piping placement.

13. The computer program product of claim 12, wherein after receiving an input from a user, the method further comprises:

determining whether the nozzle placement or piping placement violate a constraint; and activating an alert when at least one of the nozzle placement and the piping placement violate a constraint.

14. A computer program product tangibly embodied on a non-transitory computer readable medium, the computer program product including instructions that, when executed by a processor, cause the processor to perform operations comprising:

determining nozzle placement for nozzles of a fire suppression system within a location;

determining piping placement for pipes of the fire suppression system within the location; determining whether the nozzle placement or piping placement violate a constraint; and generating a map displaying the nozzle placement and the piping placement on a computing device, activating an alert when at least one of the nozzle placement and the piping placement violate a constraint;

wherein determining piping placement for pipes of the fire suppression system within the location further comprises:

obtaining a layout of nozzles within a location for a fire suppression system;

determining a number of pipes, a length of each of the pipes, and a location of each of the pipes to connect each nozzle within the location to a fire suppression agent source in response to the layout of nozzles within the location;

determining locations of junctions and elbows to interconnect the pipes; and determining whether the pipe, junctions, and elbows violate a piping constraint.

* * * * *